M. VACULA.
AUTOMOBILE LAMP.
APPLICATION FILED DEC. 10, 1913.
1,092,412.
Patented Apr. 7, 1914.
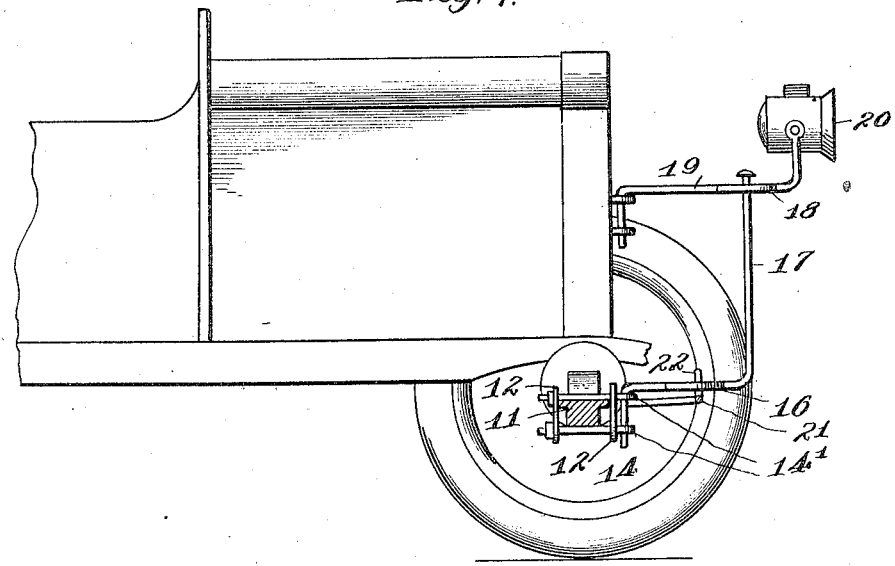
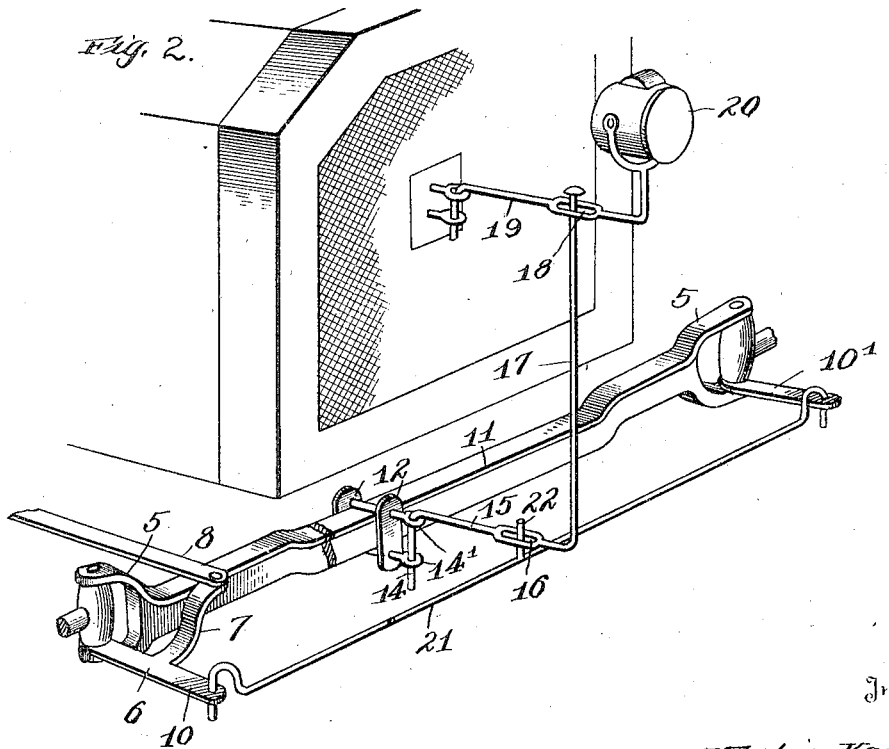
Witnesses
G. A. Raubuschmidt
Milton E. Lowry
Inventor
Martin Vacula
By A. M. Wilson
Attorney

UNITED STATES PATENT OFFICE.

MARTIN VACULA, OF MUNHALL, PENNSYLVANIA.

AUTOMOBILE-LAMP.

1,092,412.         Specification of Letters Patent.         Patented Apr. 7, 1914.

Application filed December 10, 1913.   Serial No. 305,776.

*To all whom it may concern:*

Be it known that I, MARTIN VACULA, a subject of the Emperor of Austria-Hungary, residing at Munhall, in the county of Allegheny and State of Pennsylvania, have invented certain new and useful Improvements in Automobile-Lamps, of which the following is a specification.

This invention relates to certain new and useful improvements in automobile lamps, and relates more specifically to mechanism for automatically operating the lamp to cause the same to follow the steering wheels of the automobile in the turning movement of said wheels.

The invention has for its object the provision of novel, simple and effective means for accomplishing this result, and it resides in the construction, combination and arrangement of parts as will be hereinafter more specifically pointed out and then claimed, and in describing the invention in detail, reference will be had to the accompanying drawings forming a part of this specification and wherein like numerals of reference indicate like parts throughout the different views in which:—

Figure 1 is a view in side elevation of the lamp and operating mechanism, showing in side elevation a part of the automobile with the front axle in transverse section, and Fig. 2 is a perspective view of the mechanism and a part of the automobile.

In the illustrated embodiment of my invention but a single lamp is shown, since this illustrates the principle involved. This lamp may be supplemental to the usual side lamps (not shown) or utilized in lieu of such side lamps, or one or both of the side lamps operated as herein shown.

To put my invention into practice, I provide one of the steering knuckles 5 with a T-shaped bracket 6, to the leg 7 of which is pivotally-attached the forward end of a rod or bar 8 that extends back to, and at its rear end is suitably connected to steering post in such manner that as the post is turned, the rod 8 will be actuated and through it, the member 6. Said member 6 also has a forwardly-extending arm 10, the purpose of which will hereinafter more fully appear.

Attached to the front axle 11 is a clamp 12 having a pair of eyes 14' that receive a downwardly-extending arm 14 on the inner end of the actuating rod 15. This rod 15 extends forwardly from the axle and has an oblong eye 16. Beyond the eye 16 the rod has an upwardly-extending portion 17 constituting a throwing arm or lever that extends through an eye 18 in the supporting arm 19 of the lamp 20. Said arm 19 is pivotally supported at its inner end from a suitable point on the automobile. The other steering knuckle 5 has a forwardly-extending arm 10' and the arms 10—10' are connected by a connecting rod 21 having an upwardly-extending pin 22 that is received in the eye 16 of the actuating rod 15.

In operation, turning of the steering post to turn the front wheels to the right or left causes rod 8 to actuate member 6, and through the medium of rod 21 move rod 15 and cause lever 17 to move rod 19 to turn the lamp 20 in the same direction as the wheels have been turned, that the light may always be projected straight ahead of the machine.

While a specific embodiment of the invention has been shown and described, it will be evident that various changes may be made in the details of construction without departing from the general spirit of the invention.

Having fully described my invention, what I claim is:—

Means for shifting the head lamp of an automobile comprising in combination, a lamp, a pivotally-mounted supporting arm therefor provided with an eye, a pivotally-mounted actuating rod extending into said eye, said actuating rod provided with an eye, a connecting rod between the steering knuckles, and a pin carried by the connecting rod and extending into the eye in the actuating rod for shifting the lamp when the wheels are turned.

In testimony whereof I affix my signature in presence of two witnesses.

MARTIN VACULA.

Witnesses:
  JOSEPH HLASNIČEK,
  MARY FAJTACK.